United States Patent Office 3,131,182
Patented Apr. 28, 1964

3,131,182
METHOD OF PREPARING SULPHANYL-
AMIDO-PYRIMIDINE
Aldo Garzia, Milan, Italy, assignor to Istituto
Chemioterapico Italiano S.p.A., Milan, Italy
No Drawing. Filed Jan. 17, 1962, Ser. No. 166,931
Claims priority, application Italy Sept. 8, 1961
3 Claims. (Cl. 260—239.75)

This invention relates to the preparation of sulphanyl-amido-pyrimidines by condensation of a suitable guanidine derivative with a beta-aminoacrolein.

A method of this kind together with examples of guanidine and beta-aminoacrolein derivatives suitable for the purpose are disclosed by Italian patent specification No. 553,409 (British patent specification No. 756,506). However, this method requires special precautions for removing water formed during reaction; moreover, the resulting product requires purification from the unreacted guanidine derivative.

This invention provides a method of preparing sulphanyl-amidopyrimidines avoiding the above mentioned drawbacks.

Broadly, the method comprises the step of carrying out the above mentioned condensation in a practically water-immiscible alcoholic solvent and extracting the condensation product by means of water.

The invention applies more particularly to preparation of sulphadiazine (2-p-aminobenzene-sulphamidopyrimidine) of the formula:

$$H_2N-\langle\phantom{x}\rangle-SO_2-NH-C\begin{smallmatrix}N-CH\\ \phantom{x}\\ N=CH\end{smallmatrix}CH$$

wherein p-aminobenzene sulphoguanidine is condensed with an N-dialkyl-substituted beta-aminoacrolein, such as beta-N-diethylaminoacrolein, as well as to the preparation of 2-p-aminobenzene-sulphamido-5-methyl-pyrimidine of the formula:

$$H_2N-\langle\phantom{x}\rangle-SO_2-NH-C\begin{smallmatrix}N-CH\\ \phantom{x}\\ N=CH\end{smallmatrix}C-CH_3$$

wherein p-aminobenzene-sulphoguanidine is condensed with an N-dialkyl-substituted beta-amino-alpha-methyl-acrolein, such as beta-dimethylamino-alpha-methyl-acrolein.

The reaction temperature ranges between 60° and 90° C., operation being carried out in a water-immiscible alcoholic solvent in the presence of an alkali metal alcoholate of the same alcohol as used as a solvent, so that the reaction product comprises the alkali metal salt of sulphodiazine or its 5-methyl-derivative. This salt is extracted by means of water, whereafter the desired sulphamidic product is precipitated from the solution, the latter being adjusted to a pH of about 6.5 by addition of an acid, such as hydrochloric acid. The optimum pH for precipitation is 6.5.

I preferably employ as alcoholic solvent n-butanol, sec-butanol and ter-butanol. However, a number of other alcohols can conveniently be employed provided they are liquid at the reaction temperature. The alkali metal alcoholate preferably consists of sodium butylate. Its proportion is a stoichiometric one, in the sense that one mole of alcoholate is employed to one mole of sulphoguanidine and one mol of beta-aminoacrolein.

As far as the reaction temperature is concerned temperatures below 60° C. do not yield satisfactory outputs, while temperatures exceeding 90° C. involve the risk of decomposition.

The two reagents are usually employed by equimolar proportions. The yield amounts as an average to 80%.

Example 1

23 g. (1 mole) sodium metal is dissolved in 500 ml. n-butanol. The solution is admixed with 214 (1 mole) p-aminobenzene-sulphoguanidine and 99 g. (1 mole) beta-dimethylamino-acrolein N-dimethylaminoacrolein. The temperature is raised to 80° C., stirring being pursued during 10 hours.

After cooling to ordinary temperature, extraction is carried out by means of 500 ml. water. The aqueous phase is decolored by means of 5 g. active carbon, filtered and adjusted to pH=6.5 by means of hydrochloric acid.

The resulting precipitate is separated by filtering and dried. 215 g. raw sulphadiazine are obtained. For purification purposes the product is dissolved in ammonia, the resulting solution being filtered, and sulphadiazine being again precipitated by means of hydrochloric acid. The result is 200 g. pure sulphodiazine, melting point 253° C.; yield 80% of the theory to sulphoguanidine employed.

Example 2

23 g. (1 mole) sodium metal are dissolved in 500 ml. isobutanol. The solution is admixed with 214 g. (1 mole) p-aminobenzene-sulphoguanidine and 113 g. (1 mole) beta-N-dimethylamino-alpha-methyl-acrolein. The further operation is carried out as described in Example 1.

I obtain about 230 g. pure 2-p-aminobenzenesulpho-amido-5-methyl-pyrimidine, melting point 259–260; yield 80% of the theory to the sulphoguanidine employed.

Example 3

23 g. (1 mole) sodium metal are dissolved in 500 ml. n-butanol. The solution is then additioned with 214 g. (1 mole) p-aminobenzene-sulphoguanidine and 231 g. raw β-(methyl-phenyl)-aminoacrolein at 70% (equal to 161 g. pure compound), whereupon the temperature is raised to 80° C. and the reaction mass is stirred through 10 hours. After cooling to ambient temperature extraction is performed by means of water and the aqueous phase is decolored with 5 g. active carbon.

The subsequent steps are then carried out as in Example 1, whereby 215 g. raw sulphadiazine are obtained. The product is purified as in Example 1; 200 g. pure sulphadiazine are obtained corresponding to 80% yield.

By distilling-off butanol from the alcoholic phase, 107% g. methylaniline are recovered.

Example 4

23 g. sodium metal are dissolved in 500 ml. n-amyl alcohol. The solution is additioned with 214 g. (1 mole) p-aminobenzene-sulphoguanidine and 113 g. (1 mole) β-N-dimethylamino-α-methylacrolein. By operating as in Example 1, 230 g. 2-p-aminobenzenesulphamido-5-methylpyrimidine in pure state are obtained; yield 80%.

Example 5

23 g. sodium metal are dissolved in 500 ml. n-butanol. The solution is additioned with 214 g. (1 mole) p-aminobenzene-sulfoguanidine and 157 g. (1 mole) α-methoxy-β-N-diethylaminoacrolein. By operating as in Example 1, 224 g. 2-aminobenzenesulphamido-5-methoxypyrimidine are obtained; yield 80%.

What I claim is:
1. In a process for preparing a sulphanyl-amido-pyrimidine compound of the formula

$$H_2N-\langle\phantom{x}\rangle-SO_2-NH-C\begin{smallmatrix}N-CH\\ \phantom{x}\\ N=CH\end{smallmatrix}CR$$

wherein R is a member of the group consisting of a hydrogen atom and an alkyl radical, and wherein p-aminobenzene-sulphoguanidine is condensed with an N-dialkyl-substituted beta-aminoacrolein at a temperature of the order of 60° C. to 90° C. in the presence of an alkali metal alcoholate thereby forming a sulphanyl-amido-pyrimidine salt, the improvement which comprises the steps of carrying out said condensation in a water-immiscible, alcoholic solvent, extracting the condensation mixture with water wherein said sulphanyl-amido-pyrimidine salt is dissolved in the water and unreacted p-amino-benzene-sulphoguanidine remains in said alcoholic solvent, and precipitating substantially pure sulphanyl-amido-pyrimidine product from the aqueous extract by acidifying the latter.

2. In a process for preparing 2-p-aminobenzene-sulphamidopyrimidine, wherein p-aminobenzene-sulphoguanidine is condensed with an N-dialkyl-substituted beta-aminoacrolein at a temperature of the order of 60° C. to 90° C., in the presence of an alkali metal salt, thereby forming 2-p-amino-benzene-sulphamidopyrimidine salt, the improvement which comprises the steps of carrying out said condensation in a water-immiscible solvent selected from the group consisting of n-butanol, sec-butanol and tert-butanol, in the presence of an alkali metal butylate, extracting the condensation mixture with water whereby said sulphanyl-amido-pyrimidine salt is dissolved in the water and unreacted p-amino-benzene-sulphoguanidine remains in said alcoholic solvent, and precipitating substantially pure 2-p-aminobenzene-sulphamidopyrimidine product from the aqueous extract by acidifying the latter.

3. In a process for preparing 2-p-aminobenzene-sulphamido-5-methylpyrimidine which comprises condensing p-amido-benzene-sulphoguanidine with an N-dialkyl-substituted beta-amino-alpha-methylacrolein at a temperature of the order of 60° C. to 90° C., in the presence of an alkali metal salt thereby forming the salt of 2-p-aminobenzene sulphamido-5-methylpyrimidine, the improvement which comprises the steps of carrying out said condensation in a water-immiscible solvent selected from the group consisting of n-butanol, sec-butanol and tert-butanol in the presence of an alkali metal butylate, extracting the condensation mixture with water, whereby said salt of 2-p-aminobenzene-sulphamido-5-methylpyrimidine is dissolved in the water and unreacted p-aminobenzene-sulphoguanidine remains in said alcoholic solvent, and precipitating substantially pure 2-p-aminobenzene-sulphamido-5-methylpyrimidine product from the aqueous extract by acidifying the latter.

References Cited in the file of this patent

UNITED STATES PATENTS

| | | |
|---|---|---|
| 2,435,002 | Hartmann et al. | Jan. 27, 1948 |
| 2,497,163 | Auguste et al. | Feb. 14, 1950 |
| 2,693,466 | Evans et al. | Nov. 2, 1954 |
| 2,778,821 | Pasedach et al. | Jan. 22, 1957 |
| 3,037,977 | Maisack et al. | June 5, 1962 |